US008331644B2

(12) United States Patent
Uno

(10) Patent No.: US 8,331,644 B2

(45) Date of Patent: Dec. 11, 2012

(54) DOCUMENT HANDLING APPARATUS

(75) Inventor: Teruhiko Uno, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 317 days.

(21) Appl. No.: 12/787,653

(22) Filed: May 26, 2010

(65) Prior Publication Data

US 2011/0064279 A1 Mar. 17, 2011

(30) Foreign Application Priority Data

May 27, 2009 (JP) ................................ 2009-127886

(51) Int. Cl.
*G06K 9/00* (2006.01)

(52) U.S. Cl. ....................................... 382/135; 382/112

(58) Field of Classification Search ........................ None
See application file for complete search history.

(56) References Cited

U.S. PATENT DOCUMENTS 6,621,916 B1 * 9/2003 Smith et al. ................... 382/112
7,619,721 B2 11/2009 Jones et al.

FOREIGN PATENT DOCUMENTS

| | | |
|---|---|---|
| CN | 1257373 | 6/2000 |
| EP | 1011079 | 6/2000 |
| JP | 06-27035 | 2/1994 |
| JP | 08-292158 | 11/1996 |
| WO | WO 01/54076 | 7/2001 |

OTHER PUBLICATIONS

Littmann, et al., Adaptive Color Segmentation—A Comparison of Neural and Statistical Methods, Jan. 1997, IEEE Transactions on Neural Networks, vol. 8, No. 1, 175-185.*
European Search Report dated Oct. 1, 2010.
Chinese Office Action dated Feb. 13, 2012.

* cited by examiner

*Primary Examiner* — Samir Ahmed
*Assistant Examiner* — Raphael Schwartz
(74) *Attorney, Agent, or Firm* — Pillsbury Winthrop Shaw Pittman, LLP

(57) ABSTRACT

According to one embodiment, a document handling apparatus includes an image detection unit including a plurality of light sources to irradiate a surface of a paper sheet as an inspection target with light from two different directions, and a light receiving unit configured to receive reflected light from the surface of the paper sheet, and configured to detect an image on the surface of the paper sheet, and a detected information processing unit configured process detected information from the image detection unit and determine a defacement degree of the paper sheet. The detected information processing unit is configured to detect gray contamination of the paper sheet from an image detected by simultaneously turning on the plurality of light sources and to detect wrinkles or folds of the paper sheet from an image detected by turning on one of the plurality of light sources.

3 Claims, 11 Drawing Sheets

Light source lighting timing of optical system

Relationship between illumination pattern and image

Relationship between illumination pattern and image

Relationship between illumination pattern and image

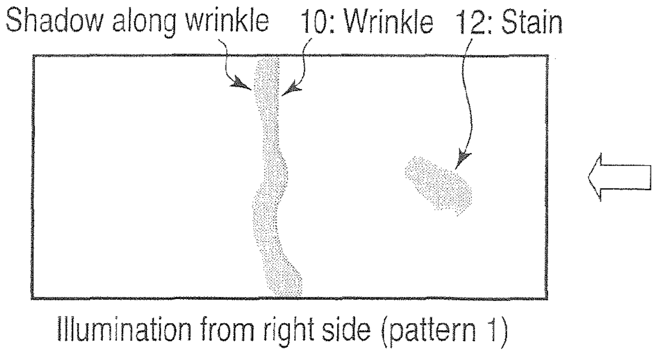
FIG. 8A Relationship between illumination pattern and image
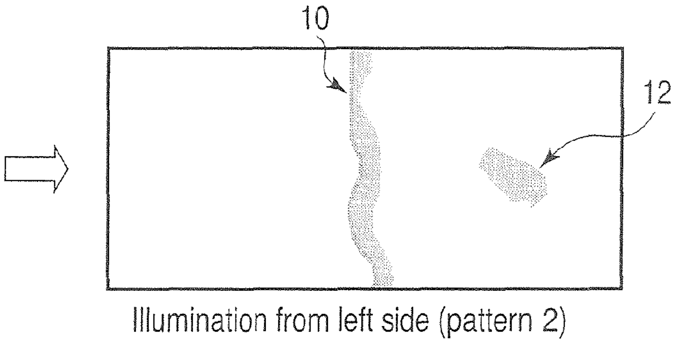
FIG. 8B Relationship between illumination pattern and image
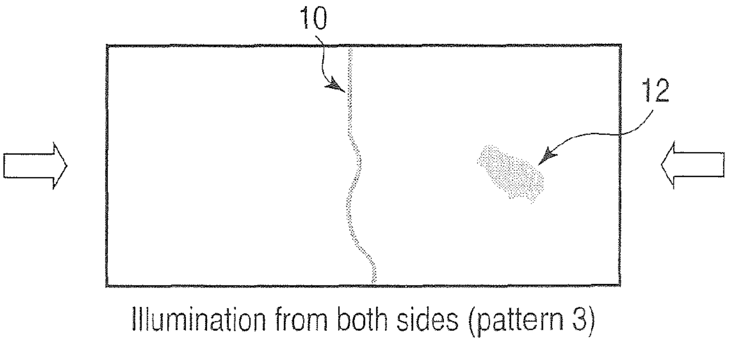
FIG. 8C Relationship between illumination pattern and image
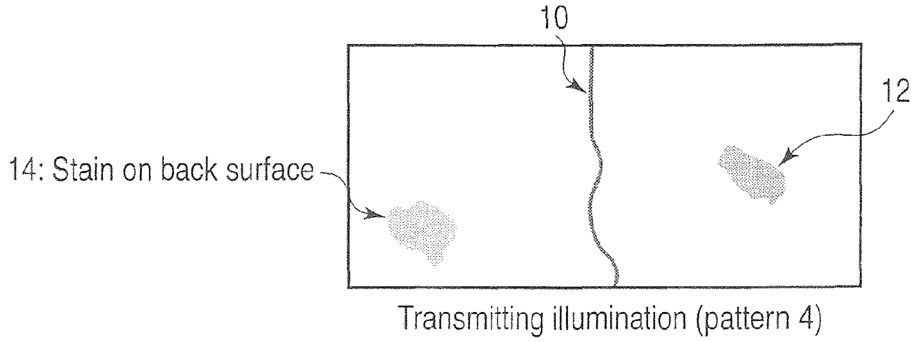
FIG. 8D Relationship between illumination pattern and image Printing example of paper sheet as reference Small regions for selecting defaced degree measurement areas Defaced degree detection areas Printing example of paper sheet as evaluation target Shifted small regions for defacement degree measurement Defacement degree detection areas

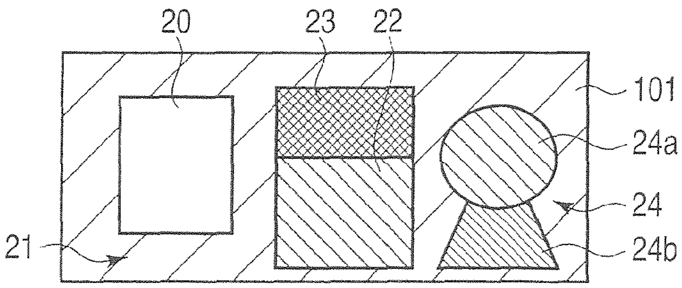
FIG. 11A Printing example of paper sheet (visible images)
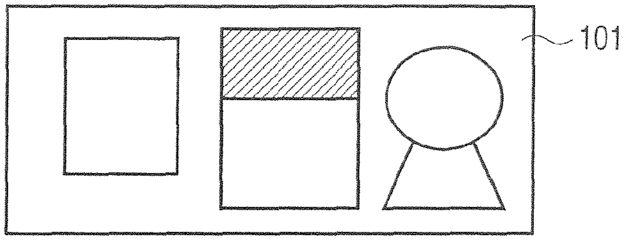
FIG. 11B Printing example of paper sheet (infrared transmitted images)
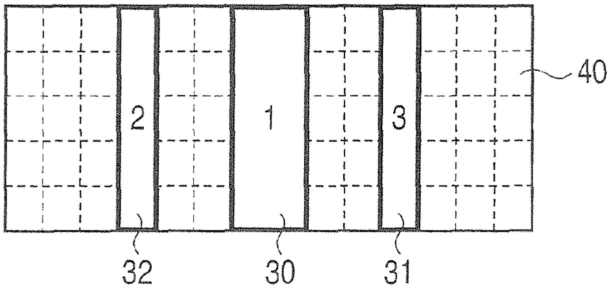
FIG. 11C Defacement degree detection areas 1
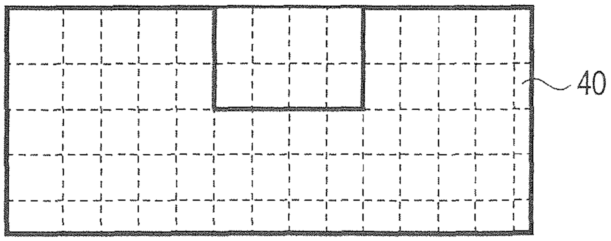
FIG. 11D Defacement degree detection area 2
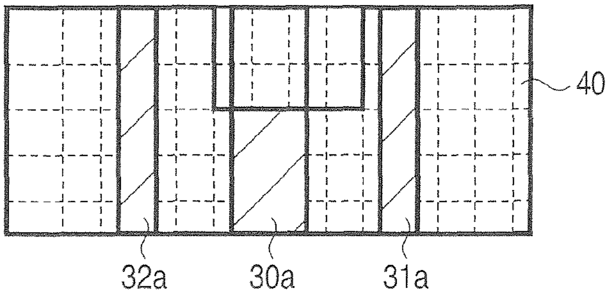
FIG. 11E Determined defacement degree detection areas Ultraviolet image Red image Green image Blue image Infrared image List of arithmetic expressions of respective pieces image data

| A \ B | UV | RED | GREEN | BLUE | IR |
|---|---|---|---|---|---|
| UV | A | A+B | A+B | A+B | A+B |
| | | A−B | A−B | A−B | A−B |
| | | 2A+B | 2A+B | 2A+B | 2A+B |
| | | 2A−B | 2A−B | 2A−B | 2A−B |
| | | 3A+B | 3A+B | 3A+B | 3A+B |
| | | 3A−B | 3A−B | 3A−B | 3A−B |
| | | 3A+2B | 3A+2B | 3A+2B | 3A+2B |
| | | 3A−2B | 3A−2B | 3A−2B | 3A−2B |
| RED | | A | A+B | A+B | A+B |
| | | | A−B | A−B | A−B |
| | 2A+B | | 2A+B | 2A+B | 2A+B |
| | 2A−B | | 2A−B | 2A−B | 2A−B |
| | 3A+B | | 3A+B | 3A+B | 3A+B |
| | 3A−B | | 3A−B | 3A−B | 3A−B |
| | 3A+2B | | 3A+2B | 3A+2B | 3A+2B |
| | 3A−2B | | 3A−2B | 3A−2B | 3A−2B |
| GREEN | | | A | A+B | A+B |
| | | | | A−B | A−B |
| | 2A+B | 2A+B | | 2A+B | 2A+B |
| | 2A−B | 2A−B | | 2A−B | 2A−B |
| | 3A+B | 3A+B | | 3A+B | 3A+B |
| | 3A−B | 3A−B | | 3A−B | 3A−B |
| | 3A+2B | 3A+2B | | 3A+2B | 3A+2B |
| | 3A−2B | 3A−2B | | 3A−2B | 3A−2B |
| BLUE | | | | A | A+B |
| | | | | | A−B |
| | 2A+B | 2A+B | 2A+B | | 2A+B |
| | 2A−B | 2A−B | 2A−B | | 2A−B |
| | 3A+B | 3A+B | 3A+B | | 3A+B |
| | 3A−B | 3A−B | 3A−B | | 3A−B |
| | 3A+2B | 3A+2B | 3A+2B | | 3A+2B |
| | 3A−2B | 3A−2B | 3A−2B | | 3A−2B |
| IR | | | | | A |
| | | | | | |
| | 2A+B | 2A+B | 2A+B | 2A+B | |
| | 2A−B | 2A−B | 2A−B | 2A−B | |
| | 3A+B | 3A+B | 3A+B | 3A+B | |
| | 3A−B | 3A−B | 3A−B | 3A−B | |
| | 3A+2B | 3A+2B | 3A+2B | 3A+2B | |
| | 3A−2B | 3A−2B | 3A−2B | 3A−2B | |

FIG. 13

DOCUMENT HANDLING APPARATUS

CROSS-REFERENCE TO RELATED APPLICATIONS

This application is based upon and claims the benefit of priority from Japanese Patent Application No. 2009-127886, filed May 27, 2009; the entire contents of which are incorporated herein by reference.

FIELD

Embodiments described herein relate generally to a document handling apparatus that determines a type, authenticity, a defacement degree and others of a paper sheet such as valuable securities.

BACKGROUND

In general, a document handling apparatus such as a paper sheet determination apparatus includes a plurality of detecting means for detecting a type, authenticity or a defacement degree of a paper sheet such as valuable securities. The determination of a type or a defacement degree of paper sheet is usually performed based on recognition of the most characteristic visible image. That is because the paper sheet is fundamentally designed and have colors, characters, numbers and others drawn thereon on the assumption that humans can easily distinguish them, and a paper sheet determination apparatus uses an image sensor, a color determination sensor and others in particular.

When a human determines a defacement degree of a paper sheet, two methods are usually adopt. One is a method of detecting flexibility or toughness of medium. This is a method that uses a feeling of fingers to detect that a paper sheet loses toughness when fibers of a paper sheet as a material are fractured or a liquid adheres while the medium is circulated for a long time. Another one is a method of visually detecting contamination on a surface of a paper sheet. Empirically, contamination, wrinkles, folds and others of a non-printed portion of a paper sheet, e.g., a watermark part or a part having a relatively low printing ink concentration in case of valuable securities are observed to determine a defacement degree.

Even the paper sheet determination apparatus adopts a technique of determining a defacement degree of a paper sheet based on the above-described two methods. According to the former method, toughness is determined based on an intensity level of sound produced when a measurement target medium is carried. On the other hand, the latter method detects brightness of a non-printed part paper sheet, rugosity of the non-printed part, a transmission factor of the non-printed part, shading characteristics of a folded part of a paper sheet, brightness of a periphery of the paper sheet, brightness of the entire paper sheet, shading characteristics of the entire paper sheet and others.

As described above, in the paper sheet determination apparatus that determines, e.g., a defacement degree of a paper sheet by using an image, the defacement degree is detected based on shading or wrinkles of a non-printed part which is not affected by printing. Therefore, accurately determining a paper sheet which is contaminated in parts other than a printed part or a paper sheet which is less contaminated but not officially sealed is difficult. Further, since a control unit in the paper sheet determination apparatus evaluates brightness of a specific region or a characteristic amount of a variance value by itself, a determination accuracy is low, and results different from the human sense are often obtained.

On the other hand, according to the method of detecting flexibility or toughness of a paper sheet, an accidentally contaminated paper sheet, e.g., a paper sheet having stain of coffee or an officially sealed note having wrinkles from washing cannot be accurately determined, and a defacement degree cannot be highly accurately determined in any case.

BRIEF DESCRIPTION OF THE DRAWINGS

FIG. 8A, FIG. 8B, FIG. 8C and FIG. 8D are plan views each showing a relationship between an irradiation pattern and an obtained image;

FIG. 11A, FIG. 11B, FIG. 11C, FIG. 11D and FIG. 11E are a view showing a printing pattern of a paper sheet as a determination target, a view showing infrared transmitted images of the paper sheet, a view showing contamination degree detection regions of folds of the paper sheet, a view showing second contamination degree detection regions of the paper sheet and a view showing a determined common defacement degree detection region of the paper sheet in a paper sheet determination apparatus according to a fifth embodiment;

FIG. 13 is a view showing a list of color arithmetic expressions in paper sheet determination apparatus according to a sixth embodiment.

DETAILED DESCRIPTION

In general, according to one embodiment, a document handling apparatus having a detection unit comprises an image detection unit comprising a plurality of light sources to irradiate a surface of a paper sheet as an inspection target with light from two different directions, and a light receiving unit configured to receive reflected light from the surface of the paper sheet, and configured to detect an image on the surface of the paper sheet; and a detected information processing unit configured to process detected information from the image detection unit and determine a defacement degree of the paper sheet. The detected information processing unit is configured to detect gray contamination of the paper sheet from an image detected by simultaneously turning on the plurality of light sources and to detect wrinkles or folds of the paper sheet from an image detected by turning on one of the plurality of light sources.

A paper sheet determination apparatus according to a first embodiment will now be described in detail.

Figure 1:
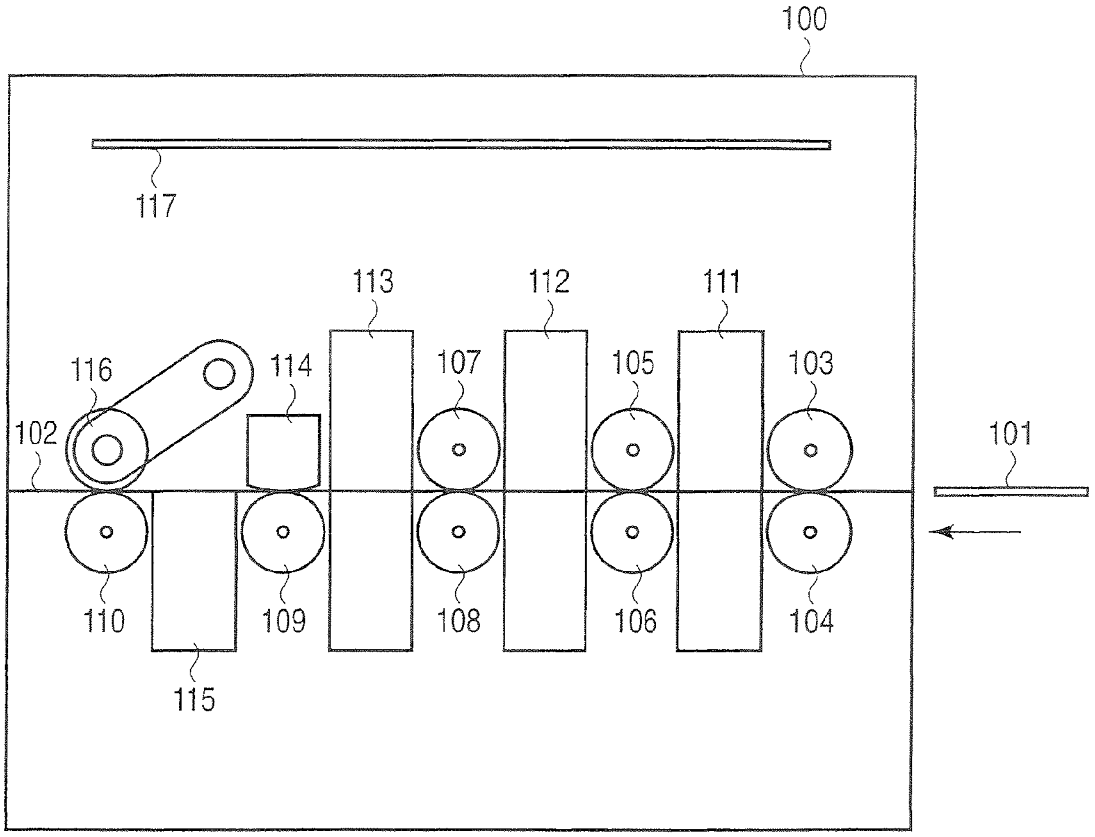
FIG. 1 is a cross-sectional view schematically showing a paper sheet determination apparatus according to a first embodiment.

FIG. 1 schematically shows a structural example of a paper sheet determination apparatus 100 according to a first embodiment. The paper sheet determination apparatus 100 serving as a document handling apparatus includes a carrying mechanism which carries a paper sheet 101 as a determination medium along a carrying path 102 extending in, e.g., a horizontal direction. The carrying mechanism has a plurality of carrying rollers 103 to 110 and a non-illustrated guide.

On the carrying path 102 are installed a transmitted image detection unit 111 configured to detect transmitted image information of the paper sheet 101, an upper surface reflected image detection unit 112 configured to detect reflected image information on an upper surface of the paper sheet 101, a lower surface reflected image detection unit 113 configured to detect reflected image information on a lower surface of the paper sheet 101, a magnetic detection unit 114 configured to detect magnetic printing characteristics of the paper sheet 101, a fluorescence emission detection unit 115 configured to detect bleach emission characteristics or fluorescence emission characteristics from the paper sheet 101, and a thickness detection unit 116 configured to detect a thickness of the paper sheet 101 and also detects a tape or a state that a plurality of paper sheets are taken. A detected information processing unit 117 which processes detected information from these detection units 111 to 116 is disposed above these detection units.

Figure 2:
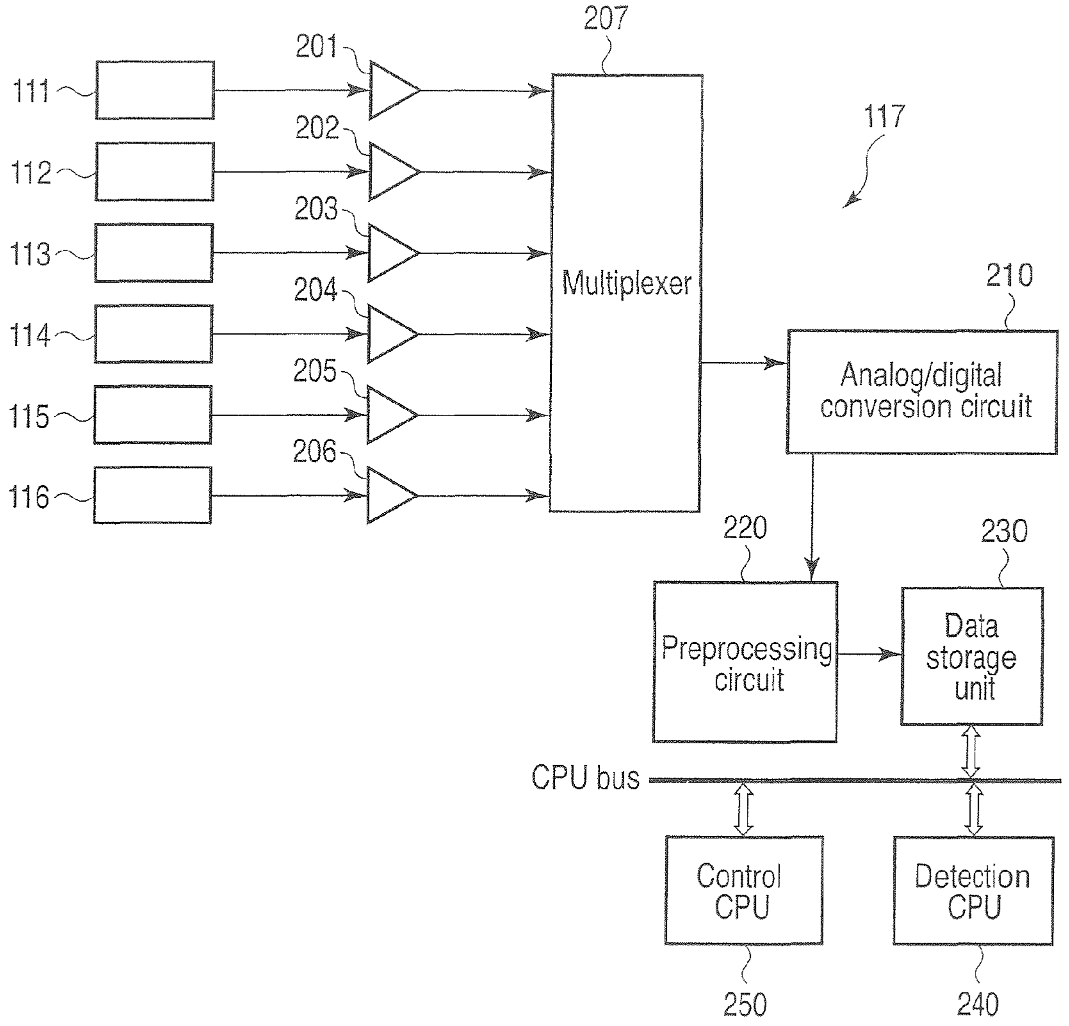
FIG. 2 is a functional block diagram of a detected information processing unit in the paper sheet determination apparatus.

FIG. 2 is a functional block diagram showing a detected information processing unit 117. As shown in FIG. 2, the transmitted image detection unit 111, the upper surface reflected image detection unit 112, a lower surface reflected image detection unit 113, the magnetic detection unit 114, the fluorescence emission unit 115 and the thickness detection unit 116 are connected to a multiplexer 207 via analog processing circuits 201, 202, 203, 204, 205 and 206 such as operation amplifiers.

Each of the transmitted image detection unit 111, the upper surface reflected image detection unit 112 and the lower surface reflected image detection unit 113 is a one-dimensional image reading sensor which has, e.g., an LED array as an emission unit and has photodiode array or a CCD as a light reception unit and uses an LED array which emits visible light, an LED array which emits near-ultraviolet light or an LED array which emits infrared light. The magnetic detection unit 114 is, e.g., a magnetic sensor like a magnetic head and configured as a sensor serving as a sensor which detects a change in flux in a secondary-side coil when direct-current bias electricity is applied to a primary side of a core material and a magnetic material passes through the magnetic head.

The fluorescence emission detection unit 115 is, e.g., a sensor which has an emission unit having an ultraviolet luminescence lamp and a light receiving unit such as a photodiode which receives excitation light from the paper sheet 101, and detects the excitation light from the paper sheet 101 in a spot viewing field. The thickness detection unit 116 sandwiches the paper sheet 101 between two rollers and converts a variation of one roller or a shaft that supports this roller into an electrical signal by using, e.g., a displacement sensor.

Pieces of detection data from the respective sensors are utilized for amplification/processing of signal components through the analog processing circuits (201 to 206) such as operation amplifiers, analog signals of six systems are time-multiplexed into an analog system of one system by the analog multiplexer 207, and then this signal is converted into, e.g., digital data of 8 bits by an analog/digital conversion circuit 210. It is to be noted that the analog signals are time-multiplexed into the signal of one system by the analog multiplexer 207 to provide one analog/digital conversion circuit in this embodiment, but all detection signals may be independently subjected to analog/digital conversion depending on how to configure the system or hardware conditions, and an effect of the paper sheet determination apparatus is not affected at all even in this case.

The detection data converted into the digital signal is subjected to preprocessing (e.g., spatial derivation or averaging) according to respective detection contents in a preprocessing circuit 220, and the processed data is stored in a data storage unit 230. The detected information processing unit 117 includes a detection CPU 240 and a control CPU 250. The detection CPU 240 is a processing arithmetic unit typified by a microcomputer, and its sequentially reads detection data from the data storage unit 230 and determines a type, a direction, authenticity, a defacement degree and others of the paper sheet 101 as the determination medium.

The control CPU 250 is likewise a processing arithmetic unit typified by a microcomputer, and it notifies a host device, e.g., a mechanism control unit (not shown) in the paper sheet determination apparatus of an arithmetic result obtained from the detection CPU 240. The mechanism control unit switches a non-illustrated carrying path switching unit based on a type, a direction, authenticity, or a defacement degree information determined by the paper sheet determination apparatus 100, and carries the paper sheet to an accumulation storage where the paper sheet 101 should be stored.

Figure 3:
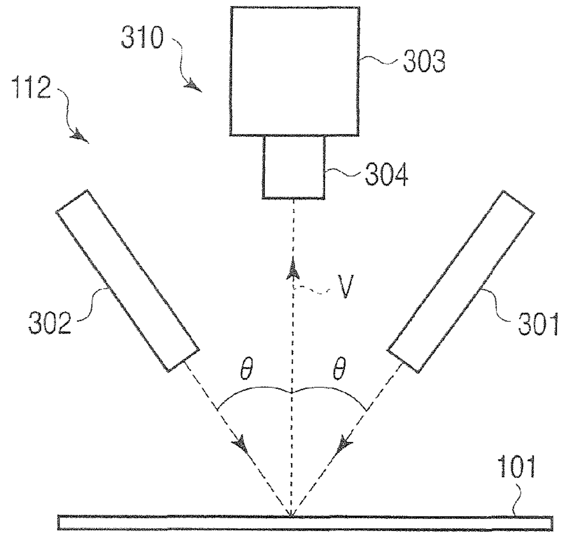
FIG. 3 is a side view showing an upper surface reflected image detection unit in the paper sheet determination apparatus.

FIG. 3 is a side view showing the upper surface reflected image detection unit 112 of the paper sheet determination apparatus 100 according to the first embodiment. According to the first embodiment, the upper surface reflected image detection unit 112 includes two light sources 301 and 302 each formed of an LTD, a halogen lamp or a fluorescent lamp and one light receiving unit 310. The light sources 301 and 302 are provided in parallel to a carrying direction of the paper sheet 101. The light sources 301 and 302 are arranged in such a manner that their optical axes cross a common irradiating position on a surface of the paper sheet 101, and they are provided to be symmetrical to a perpendicular line V for the irradiating position and inclined at an angle θ in respective opposite directions with respect to the perpendicular line V.

The light receiving unit 310 is arranged at a position where lights emitted from the light sources 301 and 302 and reflected on the surface of the paper sheet 101 are received, and it has an optical lens 304 and a photoelectronic sensor 303. The optical lens 304 is, e.g., a rod lens array which forms an image at a 1-to-1 magnification or a spherical lens which scales down an image to be formed. Detection light reflected on the surface of the paper sheet 101 is condensed by the optical lens 304 and received by the photoelectronic sensor 303. This detection light is converted into an electrical signal in the photoelectronic sensor 303, then amplified by a non-illustrated sensor signal processing substrate and subjected to A/D conversion or the like.

The photoelectronic sensor 303 is formed of one or more sensors selected from a visible range image sensor having sensitivity in a wavelength domain of 400 to 700 nm, a near-ultraviolet region image sensor having sensitivity in 400 nm or below and a near-infrared sensor having sensitivity in 700 nm or above. When the photoelectronic sensor 303 is a one-dimensional sensor such as a CCD or a photodiode, image data of the paper sheet 101 is collected and accumulated in accordance with each line, and the next line data is likewise collected and accumulated in response to carriage of the paper sheet 101, whereby a two-dimensional image can be obtained.

It is to be noted that, in the first embodiment, the lower surface reflected image detection unit 113 is configured like the upper surface reflected image detection unit 112 depicted in FIG. 3 and it is different from the upper surface reflected image detection unit 112 in that it is arranged below the paper sheet 101 and irradiates a lower surface of the paper sheet 101 with the detection light.

Figure 4:
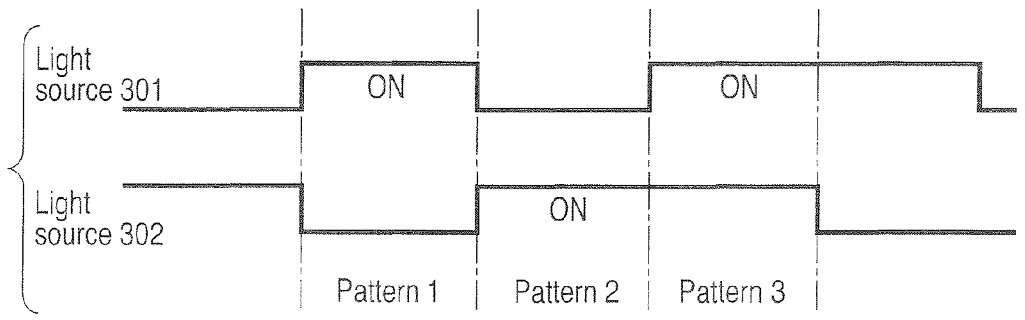
FIG. 4 is a timing chart showing illumination lighting patterns of the upper surface reflected image detection unit.

FIG. 4 shows illumination lighting patterns of the upper surface reflected image detection unit 112. As lighting timings, there are 3 patterns. The light source 301 is turned on in a pattern 1, the light source 302 is turned on in a pattern 2, and both the light source 301 and the light source 302 are turned on in a pattern 3. The paper sheet 101 is irradiated by repeating the lighting in the 3 patterns, and image data is collected from reflected light on the surface of the paper sheet 101.

Figure 5A:
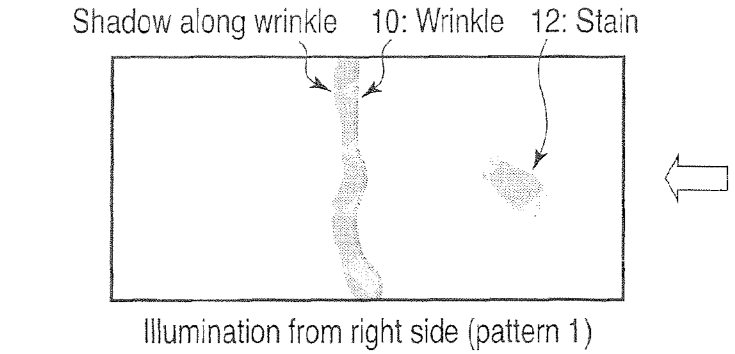
FIG. 5A, FIG. 5B and FIG. 5C are plan views each showing a relationship between an irradiation pattern and an obtained image.
Figure 5B:
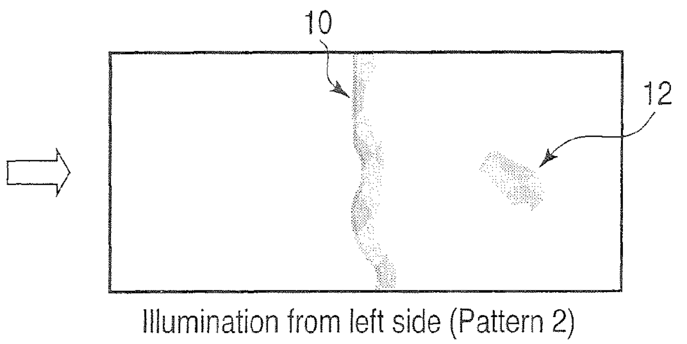
Figure 5C:
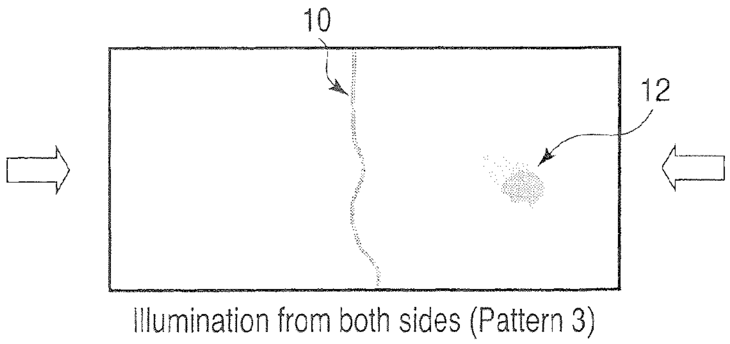

FIG. 5A, FIG. 5B and FIG. 5C show examples of image data obtained from the respective lighting patterns.

FIG. 5A shows a reflected image from the surface of the paper sheet 101 detected in a state that the light source 301 is ON (the pattern 1), and FIG. 5B shows a reflected image from the surface of the paper sheet 101 detected in a state that the light source 302 is ON (the pattern 2). In each of these reflected images, a shadow is formed on a side of a raised portion (a wrinkle) 10 at the center of the paper sheet opposite to the illumination. This shadow optically appears dark like a stain, and hence this may be determined as being defaced in some cases.

FIG. 5C shows a reflected image from the surface of the paper sheet 101 detected in a state that both the light sources 301 and 302 are ON (the pattern 3). No shadow is produced on left and right sides of the wrinkle 10. On the other hand, a defaced portion 12 on the surface of the paper sheet 101 appears darker than the periphery in all the patterns, and hence it can be determined as a stain.

Changing the lighting patterns of the light sources 301 and 302 in this manner enables detecting a defacement degree when the wrinkle 10 of the paper sheet 101 is considered as a part of the stain in the patterns 1 and 2. In the pattern 3, a defacement degree of the paper sheet can be detected when wrinkle 10 is not considered as a stain.

Furthermore, also taking image processing into consideration, in the patterns 1 and 2, the wrinkle 10 alone can be extracted by measuring a shading change point in image data. In the pattern 3, the stain portion 12 can be extracted by measuring brightness of image data.

Moreover, when a darker image in units of pixels, i.e., an image having lower shading is adopted from images obtained by the patterns 1 and 2 and one shading pattern is created, a defacement degree including all of wrinkles, shadows and stains can be detected.

According to the paper sheet determination apparatus having the above-described configuration, when the lighting pattern of the detection unit having the plurality of light sources is changed to acquire an image, image characteristics of the paper sheet can be grasped, and the single optical system and the processing circuit can be utilized to highly accurately determine shading contamination, wrinkles or folds.

It is to be noted that the light source 302 is turned on in the pattern 2, but the pattern 2 may be deleted. In this case, since the wrinkle 10 and the stain 12 can be detected in the pattern 1 and the pattern 3, the effect of the present embodiment is not jeopardized.

A paper sheet determination apparatus according to a second embodiment will now be described.

Figure 6:
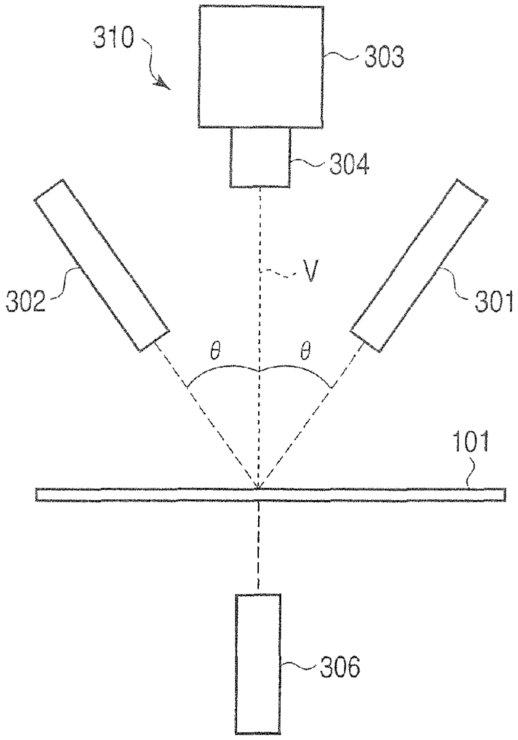
FIG. 6 is a side view showing an upper surface reflected image detection unit in a paper sheet determination apparatus according to a second embodiment.

FIG. 6 shows an upper surface reflected image detection unit 112 in a paper sheet determination apparatus according to the second embodiment. The upper surface reflected image detection unit 112 is configured by combining a transmission light source portion of a transmitted image detection unit 111. According to the second embodiment, the upper surface reflected image detection unit 112 includes three light sources 301, 302 and 306 each formed of an LED, a halogen lamp or a fluorescent lamp and one light receiving unit 310. The light sources 301 and 302 are provided in parallel to a carrying direction of a paper sheet 101, i.e., a longitudinal direction. The light sources 301 and 302 are arranged above the paper sheet 101 in such a manner that their optical axes cross a common irradiating position on a surface of the paper sheet 101, and they are provided to be symmetrical with respect to a perpendicular line associated with an irradiation position and inclined at an angle θ in respective opposite directions with respect to the perpendicular line V.

The light source 306 is arranged on a lower surface side of the paper sheet 101 and provided in such a manner that its optical axis runs through the common irradiating position to become equal to the perpendicular line V.

Toe light receiving unit 310 is arranged at a position where lights emitted from the light sources 301 and 302 and reflected on the surface of the paper sheet 101 are received and light emitted from the light source 306 and transmitted through the paper sheet 101 is received, and it has an optical lens 304 and a photoelectronic sensor 303. The optical lens 304 is, e.g., a rod lens array which forms an image at a 1-to-1 magnification or a spherical lens which scales down an image to be formed. Detection light reflected on the surface of the paper sheet 101 is condensed by the optical lens 304 and received by the photoelectronic sensor 303. This detection light is converted into an electrical signal in the photoelectronic sensor 303, then amplified by a non-illustrated sensor signal processing substrate and subjected to, e.g., A/D conversion.

The light emitted from the light source 306 passes through the paper sheet 101 to reach the optical lens 304. The transmitted light which has passed through the optical lens 304 is received by the photoelectronic sensor 303, and its light signal is converted into an electrical signal in the sensor, and then the amplification, the A/D conversion and others are performed by using the non-illustrated sensor signal processing substrate.

When the photoelectronic sensor 303 is a one-dimensional sensor such as a CCD or a photodiode, image data of the paper sheet 101 is collected and accumulated in accordance with each line, and the next data for one line is likewise collected and accumulated in response to carriage of the paper sheet 101, whereby a two-dimensional image can be obtained.

It is to be noted that, in the second embodiment, a lower surface reflected image detection unit 113 is also configured like the upper surface reflective image detection unit 112 depicted in FIG. 6 and arranged below the paper sheet 101, and it is different from the upper surface reflective image detection unit 112 in that a lower surface of the paper sheet 101 is irradiated with detection light alone.

Figure 7:
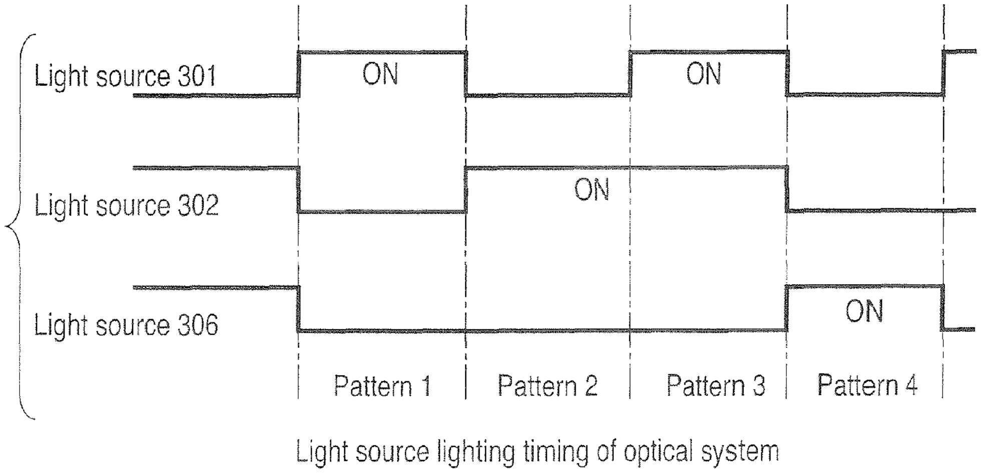
FIG. 7 is a timing chart showing an illumination lighting pattern of the upper surface reflected image detection unit according to the second embodiment.

FIG. 7 shows illumination lighting patterns of the upper surface reflected image detection unit 112. There are four lighting patterns. The light source 301 alone is turned on in a pattern 1, the light source 302 alone is turned on in a pattern 2, and both the light source 301 and the light source 302 are turned on in a pattern 3. The light source 306 alone is turned on in a pattern 4. Image data is collected by repeating lighting in these 4 patterns.

Each of FIG. 8A, FIG. 8B, FIG. 8C and FIG. 8D shows an example of image data obtained by each lighting pattern.

FIG. 8A shows a reflected image from the surface of the paper sheet 101 detected in a state that the light source 301 is ON (the pattern 1), and FIG. 8B shows a reflected image from the surface of the paper sheet 101 detected in a state that the light source 302 is ON (the pattern 2). In both the reflected images, a shadow is formed on a side of a raised portion (a wrinkle) 10 at the center of the paper sheet 101 opposite to the illumination. This shadow optically appears dark like a stain, and hence this may be determined as being defaced in some cases.

FIG. 8C shows a reflected image from the surface of the paper sheet 101 detected in a state that both the light sources 301 and 302 are ON (the pattern 3). No shadow is produced on left and right sides of the wrinkle 10. On the other hand, a defaced portion 12 on the surface of the paper sheet 101 appears darker than the periphery in all the patterns 1, 2 and 3, and hence it can be determined as a stain.

FIG. 8D shows transmitted image from the paper sheet 101 detected in a state that the light source 306 is ON (the pattern 4). The defaced portion 12 appears darker than she periphery like the reflected image, and a new defaced portion 14 may be discovered by transmission. This is, e.g., a stain on a back surface of the paper sheet 101. A detection accuracy for the wrinkle 10 is increased since contrast of shading becomes higher than that of the reflected image.

Changing the lighting pattern of the light sources 301, 302 and 306 in this manner enables detecting a defacement degree when the wrinkle 10 of the paper sheet 101 is considered as a part of the stain in the patterns 1 and 2. In the pattern 3, a defacement degree of the paper sheet can be detected when the wrinkle 10 is not considered as a stain. In the pattern 4, defacement degrees of the wrinkle 10 and stains on the back and front surfaces of the paper sheet 101 can be detected.

Furthermore, also taking image processing into consideration, in the patterns 1 and 2, the wrinkle 10 alone can be extracted by measuring a shading change point in image data. In the pattern 3, the stain portion 12 can be extracted by measuring brightness of image data.

Moreover, when a darker image in units of pixels is adopted from images obtained by the patterns 1 and 2 and one shading pattern is created, a defacement degree including all of wrinkles, shadows and stains can be detected. In the pattern 4, the wrinkle 10 alone can be extracted by measuring the shading change point in the image data, and the stain portions on the front and back surfaces of the paper sheet 101 can be extracted by measuring brightness of the image data.

According to the paper sheet determination apparatus having the above-described configuration, image characteristics of the paper sheet can be grasped by changing the lighting pattern of the detection unit having the plurality of light sources to detect an image, and shading stains, wrinkles and folds can be highly accurately determined by using the single detection unit and the processing circuit.

It is to be noted that the light source 302 is turned on in the pattern 2, but the pattern 2 may be deleted. In this case, since the wrinkle 10 and the stain 12 can be detected in the patterns 1, 3 and 4, the effect of the present embodiment is not jeopardized. Further, a configuration that one of the light sources 301 and 302 is omitted and either the light source 301 or 302 and the light source 306 which applies the transmitted light alone are provided may be adopted. Even in this case, when the light sources are alternately or simultaneously turned on, a defacement degree including all of wrinkles, shadow and stains of the paper sheet can be detected.

A paper sheet determination apparatus according to a third embodiment will now be described.

A paper sheet determination apparatus according to this embodiment is configured in such a manner that a region where a defacement degree is to be detected is previously set in a paper sheet and the defacement degree of the paper sheet is detected and determined in the set region.

Figure 9A:
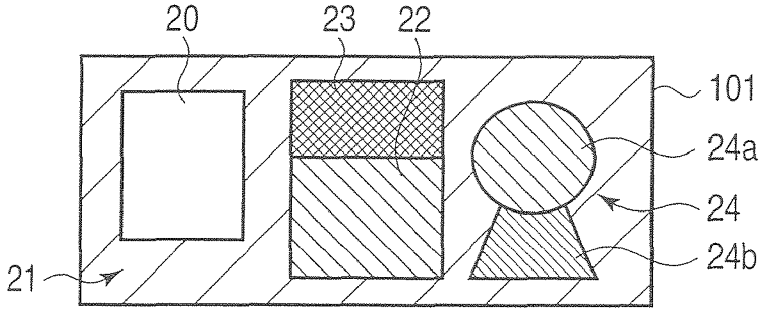
FIG. 9A, FIG. 9B and FIG. 9C are a view showing a printing pattern of a reference note, a view showing divided small regions and a view showing defacement degree detected regions of a paper sheet in a paper sheet determination apparatus according to a third embodiment.

FIG. 9A shows a printing example of a paper sheet 101 serving as a determination reference. An outline portion on a left-hand side is a watermark portion 20 and has a white paper color, an Arabic numeric character "10" representing an amount of money is provided on a lower side thereof, a line drawing 23 having high contrast is provided on an upper side at the center, and a background image 22 having low contrast is provided in a relatively pale color on the lower side. A portrait 24 is provided on a right-hand side, a facial portion 24*a* has a relatively pale color and low contrast, and a clothing portion 24*b* on a lower side is drawn with a thick line. Further, a dark background color having no contrast is provided on the entire paper space. In such a paper sheet 101, a region were a defacement degree is to be determined is extracted in the following procedure.

(1) The same officially sealed note as the paper sheet 101 as a measurement target or a similar clean note is prepared and determined as a reference note. As conditions of the reference note, a printing pattern is not misaligned with respect to the paper.

Figure 9B:
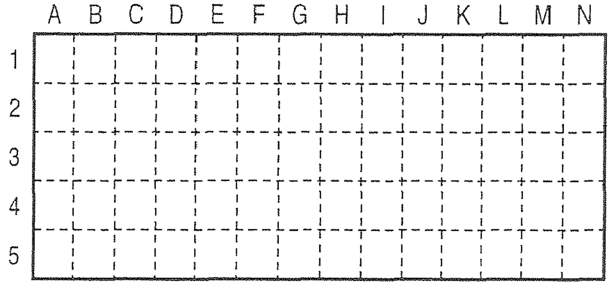

(2) As shown in FIG. 9B, the entire region of the reference note is divided into 5 (1 to 5) in a vertical direction and 14 (A to N) in a horizontal direction to provide small regions. A division reference is based on an outside dimension of the reference note.

(3) A surface of the reference note is irradiated with detection light, and an average value of reflected light intensities and a variance value of the reflected light intensities are calculated in each small region by detecting the reflected light (see Table 1 and Table 2).

TABLE 1 an average value (not smaller than 128: outline)

| | A | B | C | D | E | F | G | H | I | J | K | L | M | N |
|---|---|---|---|---|---|---|---|---|---|---|---|---|---|---|
| 1 | 50 | 50 | 50 | 50 | 50 | 60 | 60 | 60 | 60 | 50 | 50 | 50 | 50 | 50 |
| 2 | 50 | 200 | 200 | 200 | 50 | 60 | 60 | 60 | 60 | 50 | 150 | 160 | 150 | 50 |
| 3 | 50 | 200 | 200 | 200 | 50 | 130 | 130 | 130 | 130 | 50 | 160 | 160 | 160 | 50 |
| 4 | 50 | 200 | 200 | 200 | 50 | 130 | 130 | 130 | 130 | 50 | 150 | 150 | 150 | 50 |
| 5 | 50 | 50 | 50 | 50 | 50 | 80 | 80 | 80 | 80 | 50 | 70 | 70 | 70 | 50 |

TABLE 2 a variance value (less than 128: outline)

| | A | B | C | D | E | F | G | H | I | J | K | L | M | N |
|---|---|---|---|---|---|---|---|---|---|---|---|---|---|---|
| 1 | 20 | 20 | 20 | 20 | 20 | 70 | 70 | 70 | 70 | 20 | 20 | 20 | 20 | 20 |
| 2 | 20 | 10 | 10 | 10 | 50 | 180 | 180 | 180 | 180 | 50 | 80 | 80 | 80 | 50 |
| 3 | 20 | 10 | 10 | 10 | 50 | 80 | 80 | 80 | 80 | 50 | 80 | 90 | 80 | 50 |
| 4 | 20 | 140 | 170 | 140 | 50 | 80 | 80 | 80 | 80 | 50 | 150 | 150 | 150 | 50 |
| 5 | 20 | 60 | 70 | 60 | 20 | 30 | 30 | 30 | 30 | 20 | 100 | 100 | 100 | 20 |

TABLE 3 a region satisfying both → a defacement degree detection area (outline)

| | A | B | C | D | E | F | G | H | I | J | K | L | M | N |
|---|---|---|---|---|---|---|---|---|---|---|---|---|---|---|
| 1 | | | | | | | | | | | | | | |
| 2 | | | | | | | | | | | | | | |
| 3 | | | | | | | | | | | | | | |
| 4 | | | | | | | | | | | | | | |
| 5 | | | | | | | | | | | | | | |

Figure 9C:
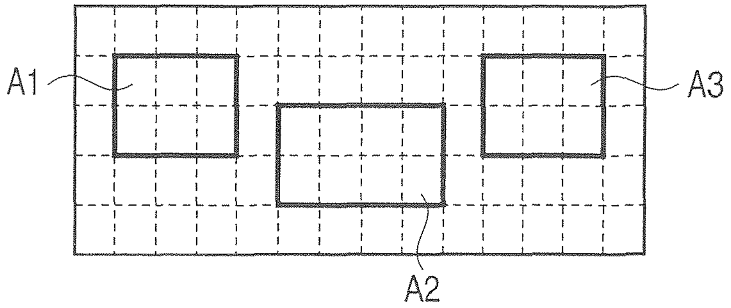

(4) A small region where the average value is equal to or above a level 128 and the variance value is less than the level 128 is extracted (Table 3, FIG. 9C). It is to be noted that normalization is performed based on an 8-bit calculation or 255 in this embodiment, and hence a minimum value is 0 and a maximum value is 255.

(5) The small region extracted in the above-described operation is determined as a defacement degree detection region for the paper sheet. In this example, each bright region having low contrast is extracted as the defacement degree detection region, and regions A1, A2 and A3 associated with the watermark portion 20, the background image 22 and the facial portion 24*a* of the portrait 24 are determined, for example.

(6) The paper sheet 101 from which a defacement degree is to be detected is carried, and a reflected image on an upper surface of the paper sheet is detected by, e.g., an upper surface reflected image detection unit 112. Furthermore, a detected information processing unit 117 calculates an average value of light intensities and a variance value of the light intensities in the defacement degree detection regions A1, A2 and A3 from detected image information.

(7) The detected information processing unit 117 evaluates a defacement degree of the paper sheet 101 in accordance with the measured average value and variance value. A lower average value and a higher variance value mean that a defacement degree of the paper sheet 101 is high.

The defacement degree detection regions A1, A2 and A3 extracted in the above-described procedure are characterized as bright regions having low contrast, and hence contamination or stains, folds of a note, or a change in color due to degradation can be relatively easily measured.

It is to be noted that the average value and the variance value are calculated based on a reflected image obtained by irradiating the surface of the paper sheet 101 with one or more of ultraviolet light, blue light (BLUE), green light (GREEN), red light (RED) and infrared light (IR).

For example, when yellowish paper and a yellowish ink are used for the paper sheet 101, since outputs from a red sensor and a green sensor are high, there is a tendency that an average value is high and a variance value is low. Thus, there are adopted:

1) an average value: an average of average values of red lights and average values of green lights in the defacement degree detection region; and 2) a variance value: an average of a variance value of the red lights and a variance value of the green lights in the defacement degree detection region.

A note type and a color of an image to be used are determined based on an area of the defacement degree detection region. That is, since a region that can be evaluated is wider as an area of the defacement degree detection region is larger, an accuracy for the defacement degree becomes high.

The division number for the small regions is not restricted to 5 in the vertical direction and 14 in the horizontal direction, and the small regions do not have to be restricted to the same size and may have different sizes. Although a light intensity, i.e., brightness in the small region is calculated as the average value, it may be an evaluation value representing brightness of the entire region like a sum total (an integral value) of pixels, for example. Moreover, although a variation in light intensity in the small region is calculated as the variance value, it may be an evaluation value representing an average value of derivative values (values of change), a sum total of derivative values, unevenness in the entire region such as a norm, a variance or contrast. That is, a surface image on the paper sheet may be divided into small regions, a sum total (an integral value) of pixels in each small region and a sum total of derivative values of pixels may be calculated, and a small region having a large integral value and a small sum total of derivative values may be adopted as the defacement degree detection region. Additionally, a surface image on he paper sheet may be divided into small regions, an evaluation value representing brightness of each small region and an evaluation value representing unevenness, variance or contrast may be calculated, and a small region having a large former evaluation value and a small latter evaluation value may be adopted as the defacement degree detection region.

A determination result of a front surface image on the paper sheet 101 is usually utilized to determine a defacement degree in priority to a determination result of a back surface image of the same. Further, in regard to the defacement degree detection region, priority is placed on determination in a region having a large average value and a region having a small variance value irrespective of a front surface image and a back surface image of the paper sheet 101.

As described above, the plurality of detection regions where detection is facilitated are previously set with respect to the paper sheet from which a defacement degree is detected, and a defacement degree of the paper sheet can be highly accurately determined by detecting and measuring a defacement degree in the detection region.

A paper sheet determination apparatus according to a fourth embodiment will now be described.

The paper sheet determination apparatus according to this embodiment is configured to previously set a region where a defacement degree is to be detected based on a printing pattern in a paper sheet and detect and determine a defacement degree of the paper sheet in the set region.

FIG. 9A shows a printing example of a paper sheet 101 as a determination target. An outline portion on a left-hand side is a watermark portion 20 and has a white paper color, an Arabic numeric character "10" representing an amount of money is provided on a lower side thereof, a line drawing 23 having high contrast is provided on an upper side at the center, and a background image 22 having low contrast is provided in a relatively pale color on the lower side. A portrait 24 is provided on a right-hand side, a facial portion 24*a* has a relatively pale color and low contrast, and a clothing portion 24*b* on a lower side is drawn with a thick line. Further, a dark background color having no contrast is provided on the entire paper space.

Figure 10A:
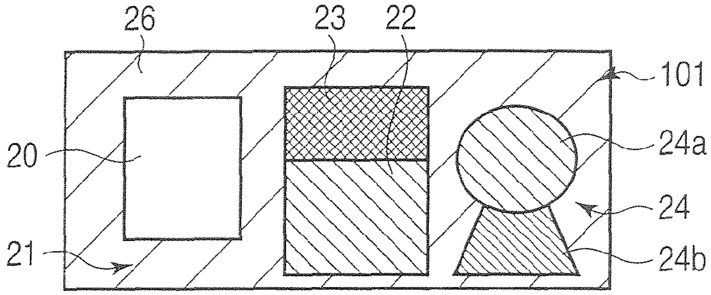
FIG. 10A, FIG. 10B and FIG. 10C are a view showing a printing pattern of a paper sheet as a determination target, a view showing divided small regions and a view showing defacement degree detected regions of a paper sheet in a paper sheet determination apparatus according to a fourth embodiment.

On the other hand, FIG. 10A shows an example of the paper sheet 101 as a determination target. A difference from the paper sheet serving as a reference depicted in FIG. 9A lies in that a printing pattern is misaligned in a lower right direction with respect to the paper. In such a case, if a defacement degree detection region is fixed, a region where measurement should not be fundamentally performed, e.g., a dark region or a region having high contrast is evaluated, and it may be determined that a defacement degree is high even though the paper sheet 101 is not contaminated.

In such a paper sheet 101 having the printing pattern misaligned with respect to the paper, a region where a defacement degree is to be determined is extracted in the following procedure.

(1) The same officially sealed note as the paper sheet 101 as a measurement target or a similar clean note is prepared and determined as a reference note. As conditions of the reference note, a printing pattern is not misaligned with respect to the paper.

(2) The entire region of the reference note is divided into 5 (1 to 5) in a vertical direction and 14 (A to N) in a horizontal direction to provide small regions. A division reference is based on an outside dimension of the reference note.

(3) For example, a surface of the reference note is irradiated with detection light by the upper surface reflected image detection unit 112 depicted in FIG. 6, and an average value of light intensities and a variance value of reflected light intensities are calculated in each small region by detecting the reflected light (see Table 1 and Table 2).

(4) A small region where the average value is equal to or above a level 128 and the variance value less than the level 128 is extracted (Table 3, FIG.). It is to be noted that normalization is performed based on an 8-bit calculation or 255 in this embodiment, a minimum value is 0 and a maximum value is 255.

(5) The small region extracted in the above-described operation is determined as a defacement degree detection region for the paper sheet. In this example, each bright region having low contrast is extracted as the defacement degree detection region, and regions A1, A2 and A3 associated with the watermark portion 20, the background image 22 and the facial portion 24*a* of the portrait 24 are determined, for example.

(6) The paper sheet 101 from which a defacement degree is to be detected is carried, and a reflected image on an upper surface of the paper sheet is detected by, e.g., the upper surface reflected image detection unit 112.

Figure 10B:
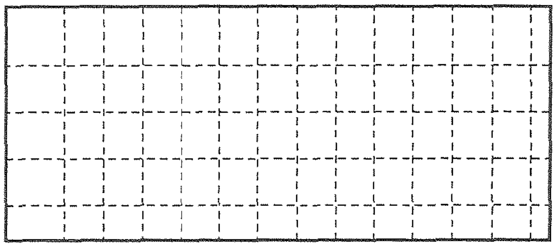
Figure 10C:
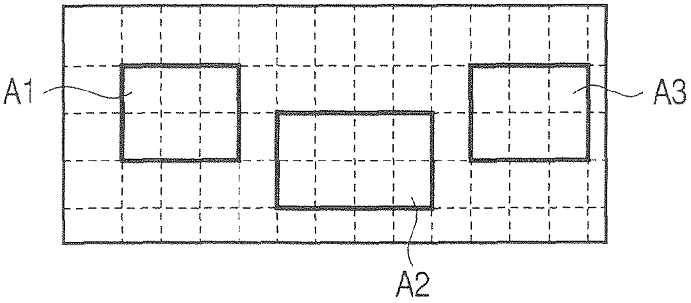

(7) The detected information processing unit 117 judges whether the printing is misaligned with respect to the paper based on the reflected image by using an image processing technique. Further, it calculates a direction along which the printing is shifted and a shift amount (see FIG. 10A), (8) As shown in FIG. 10B and FIG. 10C, positions of the defacement degree detection regions A1, A2 and A3 are changed in accordance with the shift amount the printing obtained in (7). When the printing pattern is misaligned in the lower right direction with respect to the paper, the respective small regions and the defacement degree detection regions A1, A2 and A3 are also provided at positions misaligned in the lower right direction.

(9) The detected information processing unit 117 calculates an average value of light intensities and a variance value of the light intensities in the changed defacement degree detection regions A1, A2 and A3 from detected information.

(10) The detected information processing unit 117 evaluates a defacement degree of the paper sheet 101 in accordance with the measured average value and variance value. A lower average value and a higher variance value mean that a defacement degree of the paper sheet 101 is high.

The defacement degree detection regions A1, A2 and A3 extracted in the above-described procedure are characterized as bright regions having low contrast, and hence contamination or stains, folds of a note, or a change in color due to degradation can be relatively easily measured.

It is to be noted that the average value and the variance value are calculated based on a reflected image obtained by irradiating the surface of the paper sheet 101 with one or more of ultraviolet light, blue light (BLUE), green light (GREEN), red light (RED) and infrared, light (IR).

For example, when yellowish paper and a yellowish ink are used for the paper sheet 101, since outputs from a red sensor and a green sensor are high, there is a tendency that an average value is high and a variance value is low. Thus, there are adopted:

1) an average value: an average of average values of red lights and average values of green lights in the defacement degree detection region; and 2) a variance value: an average of a variance value of the red lights and a variance value of the green lights in the defacement degree detection region.

A note type and a color of an image to be used are determined based on an area of the defacement degree detection region. That is, since a region that can be evaluated is wider as an area of the defacement degree detection region is larger, an accuracy for the defacement degree becomes high.

The division number for the small regions is not restricted 5 in the vertical direction and 14 in the horizontal direction, and the small regions do not have to be restricted to the same size and may have different sizes. Although a light intensity, i.e., brightness in the small region is calculated as the average value, it may be an evaluation value representing brightness of the entire region like a sum total (an integral value) of pixels, for example. Moreover, although a variation in light intensity in the small region is calculated as the variance value, it may be an evaluation value representing an average value of derivative values (values of change), a sum total of derivative values, unevenness in the entire region such as a norm, variance or contrast.

As described above, a defacement degree of the paper sheet can be highly accurately detected by previously setting a plurality of regions that can be readily detected with respect to the paper sheet from which a defacement degree is to be detected and detecting and measuring a defacement degree in each of these regions or by determining a position of a printing pattern as a reference to set a defacement degree detection region when the printing pattern of the paper sheet is misaligned.

A paper sheet determination apparatus according to a fifth embodiment will now be described.

The paper sheet detection apparatus according to this embodiment is configured to previously set a region where a defacement degree of a fold portion is detected in a paper sheet and detect and determine a defacement degree of the paper sheet in the set region.

FIG. 9A shows a printing example of a paper sheet 101 serving as a determination reference. An outline portion 20 on a left-hand side is a watermark region and has a white paper color, an Arabic numeric character “10” representing an amount of money is provided on a lower side thereof, a line drawing 23 having high contrast is provided on an upper side at the center, and a background image 22 having low contrast is provided in a relatively pale color on the lower side. A portrait 24 is provided on a right-hand side, a facial portion 24a has a relatively pale color and low contrast, and a clothing portion 24b on a lower side is drawn with a thick line. Further, a dark background color having no contrast is provided on the entire paper space.

On the other hand, FIG. 11A shows an example of a visible image on the paper sheet 101 as a determination target. A difference from the paper sheet serving as the reference depicted in FIG. 9A lies in that a printing pattern is misaligned in a lower right direction with respect to the paper. FIG. 11B shows an example of an infrared transmitted image of the paper sheet 101 as a determination target. This infrared transmitted image is obtained by, e.g., irradiating a back surface side of the paper sheet 101 with infrared transmission light from the light source 306 of the upper surface reflected image detection unit 112 depicted in FIG. 6 and receiving a transmitted image by the light receiving unit 310. It can be understood that the infrared transmitted image is different from the visible image depicted in FIG. 11A in that a bright image can be obtained by the infrared transmission except a solid pattern on the upper side at the center of the paper sheet 10.

In the infrared transmitted image, wrinkles or folds of the paper sheet 101 prominently appear in particular. Therefore, infrared transmitted images are often used for detection of fold characteristics. In this embodiment, attention is paid to a defacement degree at a fold portion of the paper sheet 101.

FIG. 11C shows defacement degree detection regions when attention is paid to folds. A defacement degree detection region 30 where a fold generated when the paper sheet 101 is folded in two at the center is to be detected and defacement degree detection regions 31 and 32 where folds generated when the paper sheet 101 is folded in four are to be detected are previously set. Since folds of the paper sheet 101 are dependent on an outer shape of the paper sheet 101 irrespective of a printing pattern, the outer shape of the paper sheet is used as a reference to determine the defacement degree detection regions.

FIG. 11D shows a detection region 40 matched with an infrared transmission printing pattern. This detection region 40 is dependent on the printing pattern, and hence regions are divided by using he printing pattern of the paper sheet 101 as a reference. As described above, in an infrared transmitted image, a bright image can be obtained except a solid pattern on an upper side at the center of the paper sheet 101, and hence this bright region is determined as the detection region 40.

Further, as represented by hatched background portions in FIG. 11D, portions where the defacement degree detection regions depicted in FIG. 110 overlap the detection region 40 shown in FIG. 11D are determined as defacement degree detection regions 30a, 31a and 32a based on the infrared transmitted image.

In the paper sheet, regions where defacement degrees are to be determined are extracted in the following procedure.

(1) The same officially sealed note as the paper sheet 101 as a measurement target or a similar clean note is prepared and determined as a reference note. As conditions of the reference note, a printing pattern is not misaligned with respect to the paper.

(2) The entire region of the reference note is divided into 5 in a vertical direction and 14 in a horizontal direction to provide small regions. A division reference is based on an outside dimension of the reference note.

(3) Regions placed at positions corresponding to ¼, ½ and ¾ of a length in a longitudinal direction from an end of the reference note are extracted based on a longitudinal dimension of the reference note, and they are determined as the defacement degree detection regions 31, 30 and 32 of the paper sheet (see FIG. 11C).

(4) The paper sheet 101 from which a defacement degree is to be detected is carried, and a reflected image and an infrared transmitted image on an upper surface of the paper sheet are detected by, e.g., the upper surface reflected image detection unit 112.

(5) The detected information processing unit 117 judges whether the printing is misaligned with respect to the paper based on the obtained reflected image by using an image processing technique. Further, it calculates a direction along which the printing is shifted and a shift amount.

(6) The detection region 40 of the paper sheet is acquired in accordance with the shift amount obtained in (5) (see FIG. 11).

(7) Regions where the regions obtained in (3) and (6) overlap are determined as the defacement degree detection regions 30a, 31a and 32a of the paper sheet 101 (see FIG. 11E), (8) The information processing unit 117 calculates an average value of light intensities and a variance value of the light intensities in the defacement degree detection regions 30a, 31a and 32a from detected information of the infrared transmitted image.

(9) The detected information processing unit 117 evaluates a defacement degree of the paper sheet 101 in accordance with the measured average value and variance value. A higher variance value means that a defacement degree of the paper sheet 101 is high, i.e., a fold is large and strong.

The division number for the small regions is not restricted to 5 in the vertical direction and 14 in the horizontal direction, and the small regions do not have to be restricted to the same size and may have different sizes. Although a light intensity, i.e., brightness in the small region is calculated as the average value, it may be an evaluation value representing brightness of the entire region like a sum total (an integral value) of pixels, for example. Moreover, although a variation in light intensity in the small region is calculated as the variance value, it may be an evaluation value representing an average value of derivative values (values of change), a sum total of derivative values, unevenness in the entire region such as a norm, variance or contrast.

As described above, a defacement degree of the paper sheet can be highly accurately detected by previously setting a plurality of regions where folds can be readily detected with respect to the paper sheet from which a defacement degree is to be detected and detecting and measuring a defacement degree in each of these regions or by determining a position of a printing pattern as a reference to set a defacement degree detection region when the printing pattern of the paper sheet is misaligned.

A paper sheet determination apparatus according to a sixth embodiment will now be described.

According to this embodiment, the paper sheet determination apparatus is configured to acquire images of a plurality of colors for each of the same type of undefaced note (reference note) as a paper sheet as a determination target and a defaced note, calculate light intensity data of these images by a subtraction, an addition, a multiplication, a division, or a combination of these operations, adopt an arithmetic expression by which a difference in data between the images of the reference note and the mutilated note becomes particularly prominent, and determine a defacement degree of a detected image of the paper sheet as the determination target based on this arithmetic expression.

Each of FIG. 12A, FIG. 12B, FIG. 12C, FIG. 12D and FIG. 12E shows an example of an ultraviolet (UV) image, a blue (B) image, a green (G) image, a red (R) image and an infrared (IR) transmitted image of the same type of officially sealed note as a paper sheet that is determination target a similar clean note (a undefaced reference not, and these drawings show gray images in respective wavelength domains.

Figure 12A:
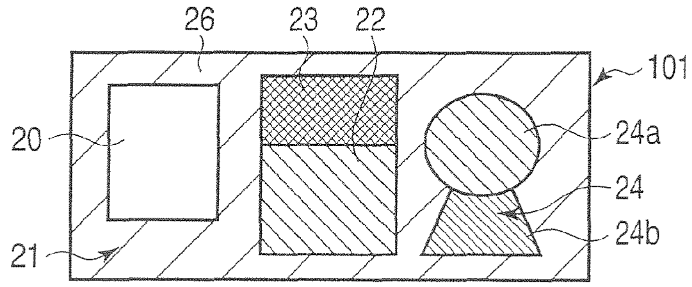
FIG. 12A, FIG. 12B, FIG. 12C, FIG. 12D and FIG. 12E are views each showing images having a plurality of colors on a paper sheet as a determination target in the paper sheet determination apparatus according to the fifth embodiment.
Figure 12B:
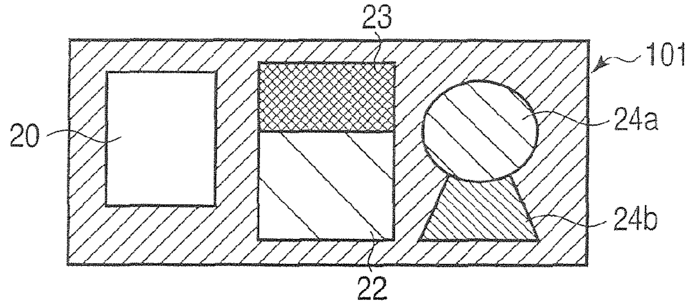
Figure 12C:
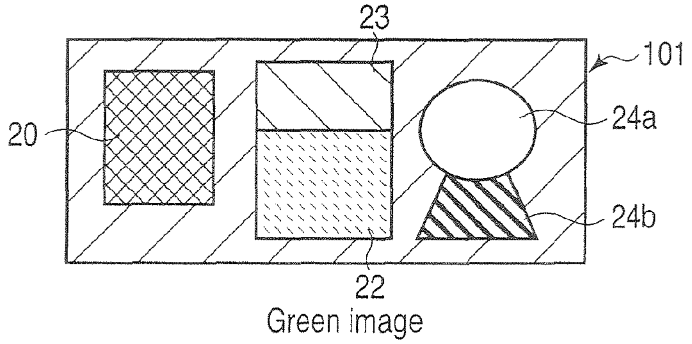
Figure 12D:
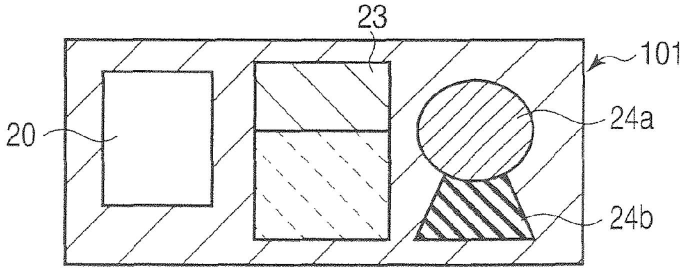
Figure 12E:
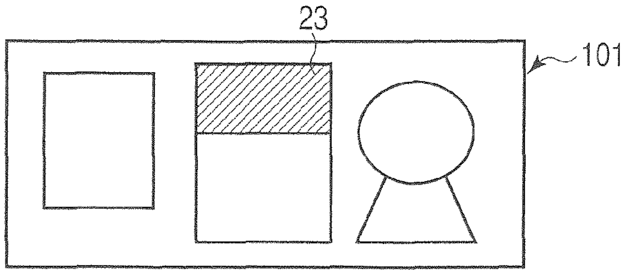

Giving a description on an ultraviolet image of the undefaced reference note depicted in FIG. 12A as a representative, a printing pattern has a watermark portion 20, a printed portion 21, a line drawing 23 on an upper side at the center, a background image 22 on a lower side at the center, a facial portion 24*a* of a portrait 24, a clothing portion 24*b* of the portrait and a background portion 26. Brightness of each portion and a variance value of a light intensity of each portion differs depending on each of images having a plurality of colors. That is, the average value and the variance value of each small region shown in Table 1 and Table 2 have values that differ depending on each of images having a plurality of colors.

A procedure for determining a defacement degree of the paper sheet by an arithmetic operation for each color image will now be described hereinafter.

(1) A reference note which is the same type as the paper sheet 101 as a measurement target and has no contamination and no printing misalignment is prepared. In regard to this reference note, the upper surface reflected image detection unit 112 and the detected information processing unit 117 obtain reflected images of 4 colors and 1 infrared transmitted image depicted in FIGS. 12A to 12E.

At this time, in the light receiving unit 310 of the detected information processing unit 117, one or more selected from an image sensor for a visible region having sensitivity in a wavelength domain of 400 to 700 nm, an image sensor for a near-ultraviolet region having sensitivity in a domain of 400 nm or below and a near-infrared sensor having sensitivity in a domain of 700 nm or above are used as the photoelectric sensor 303. The image sensor for the visible region having the sensitivity in the wavelength domain of 400 to 700 nm is constituted of one or more sensors selected from image sensors each having sensitivity in one of a blue region, a green region, a red region and a full visible region. Furthermore, when acquiring a reflected image and a transmitted image, a filter which allows ultraviolet light to pass therethrough, a filter which allows a blue color to pass therethrough, a filter which allows a green color to pass therethrough, a filter which allows a red color to pass therethrough and a filter which allows infrared light to pass therethrough are sequentially arranged in front of the lens 304, and the light receiving unit 310 receives lights in this state.

Subsequently, the detected information processing unit 117 calculates an average value of light intensities and a variance value of light intensities in the 7 regions of the ultraviolet, red, green, blue and infrared transmitted images (FIGS. 12A to 12E), i.e., the watermark portion 20, the printed portion 21, the line drawing 23 on the upper portion at the center, the background image 22 on the lower side at the center, the facial portion 24*a* of the portrait 24, the clothing portion 24*b* of the portrait and the background portion 26 in accordance with each image.

(2) A reference defaced note which is the same type as the paper sheet 101 as a measurement target, defaced by circulation and has no printing misalignment is prepared. In regard to the reference defaced note, the detected information processing unit 117 calculates an average value of light intensities and a variance value of light intensities in the 7 regions of the ultraviolet, red, green, blue and infrared transmitted images (FIG. 12A to 12E), i.e., the watermark portion 20, the printed portion 21, the line drawing 23 on the upper portion at the center, the background image 22 on the lower side at the center, the facial portion 24*a* of the portrait 24, the clothing portion 24*b* of the portrait and the background portion 26 in accordance with each image by the same method as (1).

(3) The detected information processing unit 117 performs a calculation which is a combination of an addition, a subtraction, a multiplication and a division of the average value and the variance value with respect to images of two or more colors of the reference note in accordance with the arithmetic expressions depicted in FIG. 13. For example, it carries out a subtraction of the average value and the variance value with respect to images of two or more colors, e.g., $|R-G|$ or $|IR-B-G|$, an addition of the average value and the variance value of images of two or more colors, e.g., G+B or UV+IR+R, or a combination of a subtraction and an addition of two or more colors.

Alternatively, it performs a multiplication of the average value and the variance value of images of two or more colors, e.g., R×B or IR×R×B, a division of image data of two or more colors, e.g., G/B or UV/IR/B, or a combination of the multiplication and the division of image data of two or more colors.

<Example of Arithmetic Operation>

A: UV, B: RED, Expression: $3A-B \Rightarrow |3\times UV-RED|$ $|\ |$ represents an absolute value.

(4) A combination of an addition, a subtraction, a multiplication and a division of the average value and the variance value of images of two or more colors of the reference defaced note is calculated in accordance with the arithmetic expressions depicted in FIG. 13.

(5) A difference between each arithmetic result of the reference note and each corresponding arithmetic result of the standard defaced note is calculated from the arithmetic results of (3) and (4) in accordance with each of the 7 regions, i.e., the watermark portion 20, the printed portion 21, the line drawing 23 on the upper side at the center, the background image 22 on the lower side at the center, the facial portion 24*a* of the portrait 24, the clothing portion 24*b* of the portrait and the background portion 26.

(6) When there is an arithmetic expression by which a difference obtained in (5) becomes larger than a given threshold value, this arithmetic expression is selected, i.e., a color which greatly differs depending on the reference note and the reference defaced note or the arithmetic expression of this color is selected to be utilized as an arithmetic expression for determining a defacement degree.

(7) The paper sheet 101 from which a defacement degree is to be detected is carried through the paper sheet determination apparatus, and reflected images of a plurality of colors and an infrared transmitted image on the upper surface of the paper sheet are detected by, e.g., the upper surface reflected image detection unit 112.

(8) The detected information processing unit 117 calculates an average value and a variance value of images of two or more colors in accordance with the arithmetic expression selected in (6) to determine a defacement degree of the paper sheet 101. A higher variance value means that a defacement degree of the paper sheet 101 is high.

According to the paper sheet determination apparatus having the above-described configuration, a defacement degree of the paper sheet can be highly accurately detected by acquiring images of a plurality of colors with respect to each of the reference note and the reference defaced denote and selecting a color which greatly differs depending on these images or an arithmetic operation of the color to be utilized as the arithmetic operation for determining a defacement degree.

Moreover, according to each of the foregoing embodiments, it is possible to provide the paper sheet determination apparatus which can previously grasp image characteristics of a paper sheet as a determination target and highly accurately detect gray contamination, wrinkles or folds by using the single optical system and the processing circuit.

It is to be noted that such a concept of dividing an image into small regions to carry out detection as described in the third, fourth and fifth embodiments may be introduced in the sixth embodiment. That is, when obtaining an average value and a variance value of ultraviolet, red, green, blue and infrared images (a) to (e), each image may be divided into, e.g., 5×14 small regions, and calculations may be carried out in each small region. For example, the watermark portion 20 in the image pattern corresponds to small regions B2, B3, B4, C2, C3, C4, D2, D3 and D4. Additionally, a color arithmetic operation may be performed in accordance with each of these small regions, and an arithmetic expression used for determining a defacement degree may be determined from a result of the operation.

Further, although arithmetic expressions depicted in FIG. 13 are onefold, twofold and threefold additions and subtractions of two wavelengths, they may be onefold to m-fold additions and subtractions or multiplications and divisions of n wavelengths.

Furthermore, the paper sheets serving as the detection references are one reference note having no contamination and no printing misalignment and one reference defaced note which is defaced through circulation and has no printing misalignment in the sixth embodiment, but a color arithmetic expression may be selected based on a plurality of reference notes and a plurality of reference defaced notes.

While certain embodiments have been described, these embodiments have been presented by way of example only, and are not intended to limit the scope of the inventions, indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the paper sheet serving as a determination target is not restricted to the above-described notes, and it can be applied to various paper sheets.

What is claimed is:

1. A document handling apparatus having a detection unit comprising:

an image detection unit configured to detect images of a plurality of colors on a surface of a paper sheet in accordance with each color; and a detected information processing unit configured to process detected information from the image detection unit and determine a defacement degree of paper sheet, the detected information processing unit being configured to previously detect images of a plurality of colors by using the image detection unit with respect to each of the same type of reference paper sheet as the paper sheet and a defaced reference paper sheet which has been defaced, calculate an average value and a variance value of light intensities of each detected image, calculate an average value and a variance value of images of two or more colors in the reference paper sheet based on a subtraction, an addition or an arithmetic expression which is a combination of a subtraction and an addition of two or more colors, calculate an average value and a variance value of images of two or more colors in the defaced reference paper sheet based on a subtraction, an addition or an arithmetic expression which is a combination of a subtraction and an addition of two or more colors, select an arithmetic expression of a color whose calculated value greatly differs depending on the reference paper sheet images and the defaced reference paper sheet images, detect images of a plurality of colors of the paper sheet as the inspection target by the image detection unit, calculate an average value and a variance value of light intensities in each detected image, calculate an average value and a variance value of images of two or more colors in the paper sheet by using the selected arithmetic expression, and determine a defacement degree of the paper sheet based on a result of the calculation.

2. The apparatus according to claim 1, wherein the detected information processing unit is configured to calculate an average value and a variance value of images of two or more colors in the reference paper sheet based on a multiplication, a division or an arithmetic expression which is a combination of a multiplication and a division of two or more colors, calculate an average value and a variance value of images of two or more colors in the defaced reference paper sheet based on a multiplication, a division or an arithmetic expression which is a combination of a multiplication and a division of two or more colors, and select an arithmetic expression of a color whose calculated value greatly differs depending on the reference paper sheet images and the defaced reference paper sheet images

3. The apparatus according to claim 1, wherein the detected image processing unit is configured to calculate an average value and a variance value of images of two or more colors in the reference paper sheet based on an arithmetic expression which is a combination of an addition, a subtraction, a multiplication and a division, calculate an average value and a variance value of images of two or more colors in the defaced reference paper sheet based on an arithmetic expression which is a combination of an addition, a subtraction, a multiplication and a division, and select an arithmetic expression of a color whose calculated value greatly differs depending on the reference paper sheet images and the defaced reference paper sheet.

* * * * *